(12) United States Patent
Cui et al.

(10) Patent No.: US 8,731,098 B2
(45) Date of Patent: May 20, 2014

(54) MULTIPLE GIGAHERTZ CLOCK-DATA ALIGNMENT SCHEME

(75) Inventors: Delong Cui, Tustin, CA (US); Afshin Momtaz, Laguna Hills, CA (US); Jun Cao, Irvine, CA (US)

(73) Assignee: Broadcom Corporation, Irvine, CA (US)

(*) Notice: Subject to any disclaimer, the term of this patent is extended or adjusted under 35 U.S.C. 154(b) by 518 days.

(21) Appl. No.: 12/882,739

(22) Filed: Sep. 15, 2010

(65) Prior Publication Data

US 2012/0039413 A1    Feb. 16, 2012

Related U.S. Application Data

(60) Provisional application No. 61/373,084, filed on Aug. 12, 2010.

(51) Int. Cl.
*H04L 27/04* (2006.01)
*H04L 27/20* (2006.01)

(52) U.S. Cl.
USPC ............ 375/295; 375/296; 375/297; 375/327

(58) Field of Classification Search
USPC .................................. 375/295–307
See application file for complete search history.

(56) References Cited

U.S. PATENT DOCUMENTS 5,359,630 A * 10/1994 Wade et al. .................... 375/354
8,228,972 B2 * 7/2012 Tonietto et al. ............... 375/221

* cited by examiner

*Primary Examiner* — Qutbuddin Ghulamali
(74) *Attorney, Agent, or Firm* — Sterne, Kessler, Goldstein & Fox, P.L.L.C.

(57) ABSTRACT

A transmitting system includes a clock system and a data system. The clock system is configured to receive a clock having a first value and produce a control signal having a second, different value and an output clock having the first value. The data system is configured to receive data and the control signal and to align the data with the output clock, based on the control signal, to produce output data. The clock system includes a driver configured to produce the output clock, a divider configured to divide the received clock, and a phase interpolator configured to rotate the divided clock to produce the control signal. Also, the data is parallel data, and the data system includes a multiplexer configured to receive the parallel data and to use the control signal to serialize the parallel data as the aligned data and a driver configured to produce the output data.

16 Claims, 7 Drawing Sheets

MULTIPLE GIGAHERTZ CLOCK-DATA ALIGNMENT SCHEME

CROSS REFERENCE TO RELATED APPLICATIONS

This application claims priority under 35 U.S.C. §119(e) to U.S. Provisional Patent Application No. 61/373,084, filed Aug. 12, 2010, which is incorporated by reference herein in its entirety.

FIELD OF THE INVENTION

The present invention is directed to serializer transmitters that increase a range of clock-data adjustment and preserve a high output amplitude for high speed clocks.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

This specification discloses one or more embodiments that incorporate the features of this invention. The disclosed embodiment(s) merely exemplify the invention. The scope of the invention is not limited to the disclosed embodiment(s). The invention is defined by the claims appended hereto.

The embodiment(s) described, and references in the specification to "one embodiment", "an embodiment", "an example embodiment", etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical etc., and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

Before describing such embodiments in more detail, however, it is instructive to present an example environment in which embodiments of the present invention may be implemented.

Figure 1:
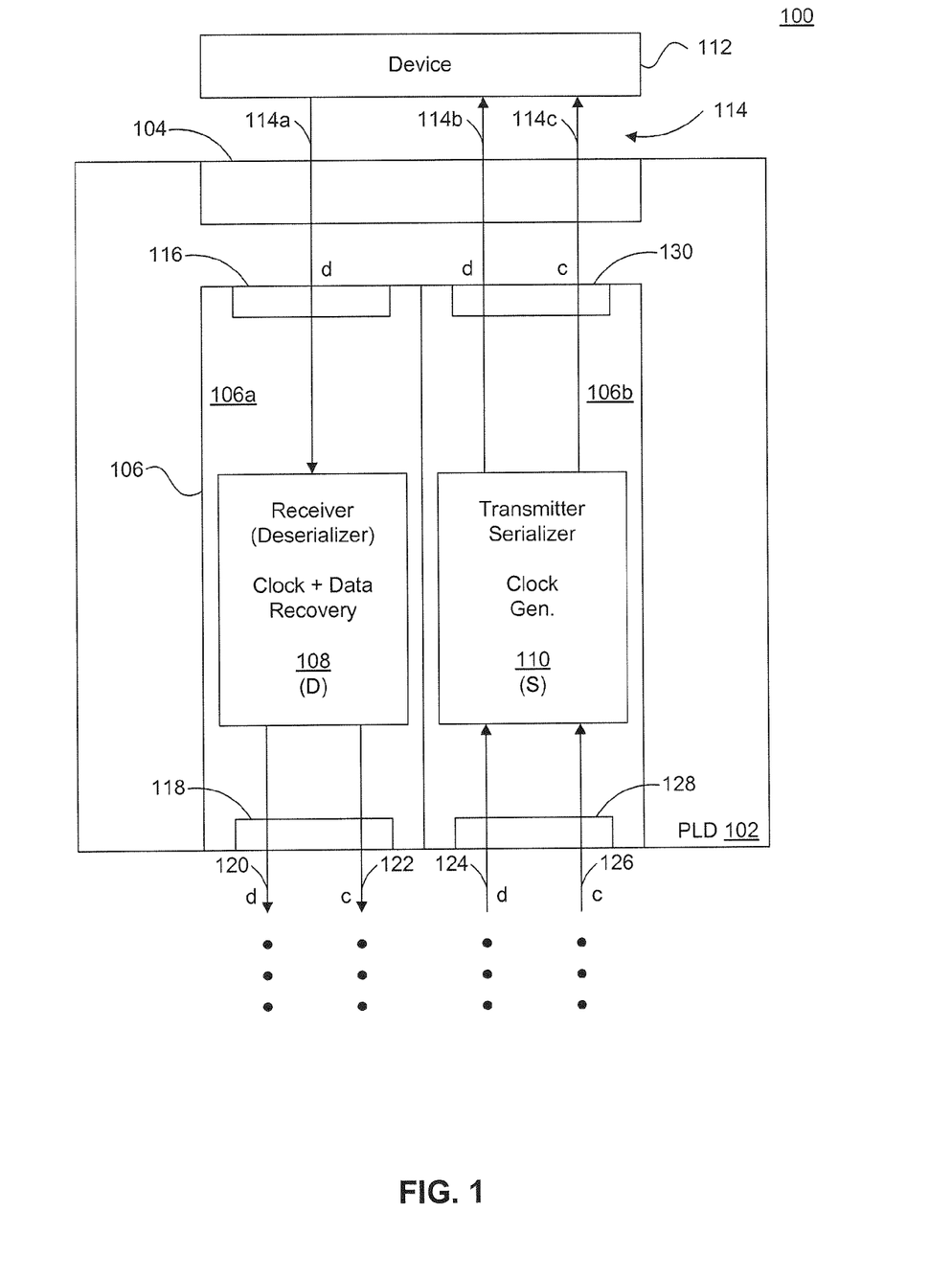
FIG. 1 is a block diagram of an example system in which an example physical layer device (PLD) may operate.

FIG. 1 is a block diagram of an example system 100 in which embodiments of the present invention may operate. System 100 includes a physical layer device (PLD) 102 operated and constructed in accordance with an embodiment of the present invention. In an embodiment, PLD 102 is constructed on a single integrated circuit (IC) substrate or chip. PLD 102 may be implemented in Complementary Metal Oxide Semiconductor (CMOS) technology, for example. Other semiconductor technologies may be used. In the drawings, the indicators "D," "S," "d" and "c" respectively indicate or represent "Deserializer," "Serializer," "data signal," and "clock signal." PLD 102 may represent or be part of a high speed data transceiver, including an Ethernet device, which can be implemented in a backplane, storage interface, and other applications.

PLD 102 includes input/output (I/O) port 104. I/O port 104 represents connectors, conductive traces, PLD I/O pins, receivers and drivers, and the like, associated with coupling signals to and from PLD 102. PLD 102 includes a serializer-deserializer (SERDES) device 106 coupled to I/O port 104. SERDES device 106 includes (i) a transmitter/serializer (S) 110 for serializing a parallel data signal, to produce a serial data signal, and (ii) a receiver/deserializer (D) 108 for deserializing a serial data signal, to produce a parallel data signal, as is described in detail below.

PLD 102 interfaces with a communication or network device 112 through I/O port 104 and a high-speed analog serial data interface 114 (where the I/O port and the data interface are collectively referred to as a serial interface of PLD 102). Network device 112 may be an Optical Fiber Module, a high speed analog serial interface, or the like.

In one example, serial data interface 114 includes bi-directional serial data signals 114a and 114b, and a clock signal 114c synchronized with serial data signal 114b. Bi-directional serial data signals 114a and 114b have example baud rates of 25 Gbps, and clock signal 114c has a corresponding example clock rate or frequency of 25 GHz.

In another example, the optical fiber module may operate in accordance with IEEE 802.3 for 1000 Base-X, for example.

In one example, serial data signals may be carried over a copper line associated with an Ethernet link, for example, coupled to I/O port 104. SERDES device 106 may be an Ethernet transceiver that operates in accordance with IEEE 802.3 for 10/100/1000 Base-T, for example.

It is understood that device 112 and SERDES device 106 are exemplary and may be replaced by a multitude of other interface devices in other arrangements. For example, SERDES device 106 and device 112 may be replaced with a transceiver and an associated interface suitable for copper-based signals.

SERDES device 106 includes a deserializer 106a and a serializer 106b. Deserializer 106a includes a deserializer input 116, a clock and data recovery module 108, and deserializer output 118. In operation, device 112 transmits serial data signal 114a to deserializer input 116 received via I/O port 104. Clock and data recovery module 108 deserializes serial data signal 114a received at deserializer input 116, to produce a deserialized data signal 120. The terms "deserializes" and "deserializing" mean to convert serial data to parallel data. Clock and data recovery module 108 recovers a clock signal 122 from received serial data signal 114a. Recovered clock signal 122 represents received signal timing, for example, the timing of data symbols included in received serial data signal 114a. Deserializer 106a transmits signals 120 and 122 from deserializer output 118 to another portion of the system or a device, as would be understood by a skilled artisan. Clock signal 122 is synchronous with data signal 120.

In one example, clock and data recovery module 108 generates deserialized data signal 120 as a series of N1-bit wide parallel digital data words, having a data rate equal to R1/N1, where R1 is the data rate of received serial data signal 114a. Thus, the aggregate data rate of deserialized data signal 120 is equal to the data rate of serial data signal 114a. Module 108 generates clock signal 122 synchronously with deserialized data signal 120, and at a frequency equal to R1/N1.

Serializer 106b includes a serializer input 128, a serializer and clock generator module 110, and a serializer output 130. A deserialized data signal 124 and an associated clock signal 126 are received by serializer input 128. Serializer and clock generator 110 serializes deserialized data signal 124 in accordance with clock signal 126, to produce serialized data signal 114b. The terms "serializes" and "serializing" mean to convert parallel data to serial data. Serializer and clock generator 110 also produces clock signal 114c synchronous with serial data signal 114b. Serializer 106b transmits signals 114b and 114c from serializer output 130.

In an example arrangement, deserialized data signal 124 includes a series of N2-bit wide parallel digital data words, having a data rate equal to R2/N2, where R2 is the data rate of received serial data signal 124. Thus, the aggregate data rate of deserialized data signal 114 is equal to the data rate of serial data signal 124. Also, clock signal 126 is synchronous with deserialized data signal 124, and has a frequency equal to R2/N2.

The terms "deserialized" and "parallel" are used equivalently and interchangeably herein. Also, a deserializer output is a parallel data output and a serializer input is a parallel data input. Together, a deserializer output (e.g., deserializer output 118) and a serializer input (e.g., serializer input 128) represent a parallel port of a SERDES device (e.g., a parallel port of SERDES device 110). Similarly, a deserializer input (e.g., deserializer input 116) and a serializer output (e.g., serializer output 130) collectively represent a serial port of a SERDES device (e.g., a serial port of SERDES device 110).

In one example, in a high speed SERDES (25 Gbs/s and more) transceiver, e.g., SERDES 106 in FIG. 1, a retiming scheme may be used to align output data and output clock. However, these high speed data and clock outputs usually have very stringent jitter and amplitude requirements. To meet the stringent requirements, a phase between data and a clock needs to be adjusted to account for any possible non-idealities, such as process variation, package and board trace mismatches, etc. Moreover, when multiple data channels are used, phase differences between different data channels may also need to be adjusted to account for the mismatches between these channels. These retiming schemes can be implemented, for example, using the systems shown in FIGS. 2, 3, and 4.

Figure 2:
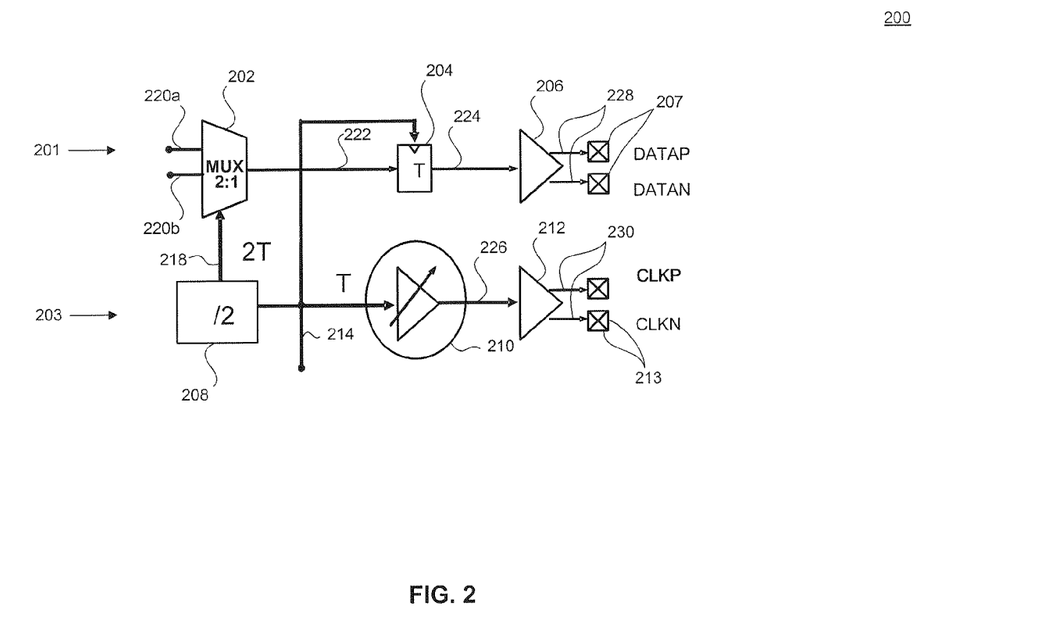
FIG. 2 illustrates a clock-data adjustment scheme in which a clock is adjusted.

FIG. 2 illustrates a clock-data adjustment system 200. In this example, clock output delay is adjusted to align an output clock 230 with output data 228. For example, system 200 can be implemented in transmitter/serializer (S) 110 of FIG. 1.

System 200 includes a data section or system 201 and a clock section or system 203. Data section 201 includes a multiplexer 202, a retimer or flip-flop 204, a driver 206, and +/− I/O pads 207. Clock section 203 includes a divider 208, a clock adjuster 210, a driver 212, and +/− I/O pads 213.

In one example, clock 214 is received at clock section 203 and travels along three paths: towards divider 208, towards retimer 204, and towards clock adjuster 210.

In one example, divider 208 (e.g., a half-time divider) divides clock 214 and produces a divided clock 218. Divided clock 218 is used to control multiplexer 202. Multiplexer 202 is used to control routing of parallel data signals 220a and 220b. Through the multiplexing of parallel data 220a and 220b, serial data 222 is produced.

In one example, retimer 204 receives clock 214, which controls timing (e.g., delay) of data 222 routed from multiplexer 202 to produce retimed data 224. Through this process retimed data 224 is now aligned with clock 214 by, e.g., shifting data 222 in time to produce data 224.

In one example, retiming is done by synchronizing either a rising or falling edge of clock 214 to align with a rising or falling edge of data 224, while synchronizing the other edge of clock 214 with a center of data 224. In this way, a predictable portion of data 224 aligns with a predictable portion of clock 214. Realignment remedies the unpredictability in data 222, in which there is no definitive link between which portion of data 222 aligns with a rising or falling edge of clock 214. Thus, in the end, a fixed relationship is established for output clock 230 and output data 228. However, it is to be appreciated that which edge of clock 230 forms a fixed alignment with either the edge or center of data 228 is application specific, and can be varied.

Figure 6:
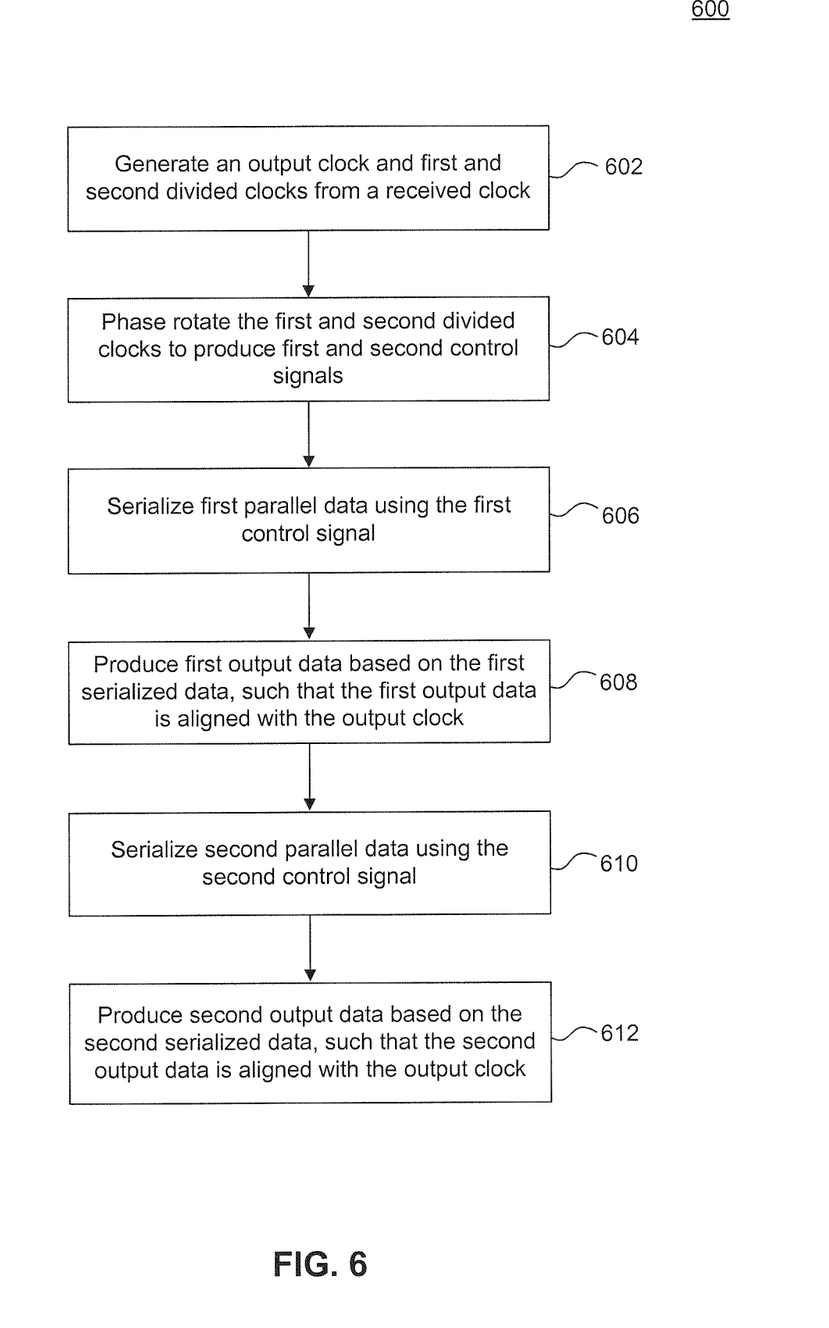
Figure 7:
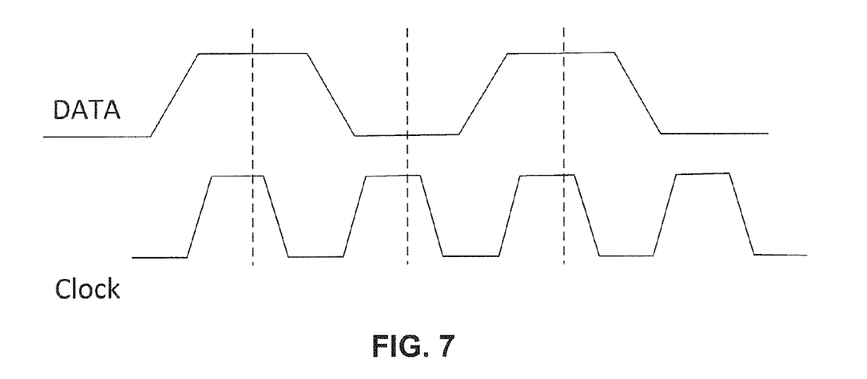
FIGS. 7, 8, and 9 show various relationships between data and clocks, according to various embodiments of the present invention.
Figure 8:
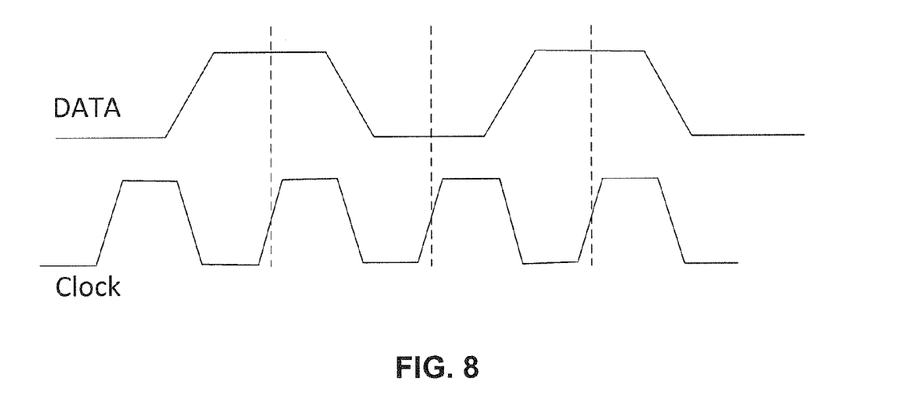
Figure 9:
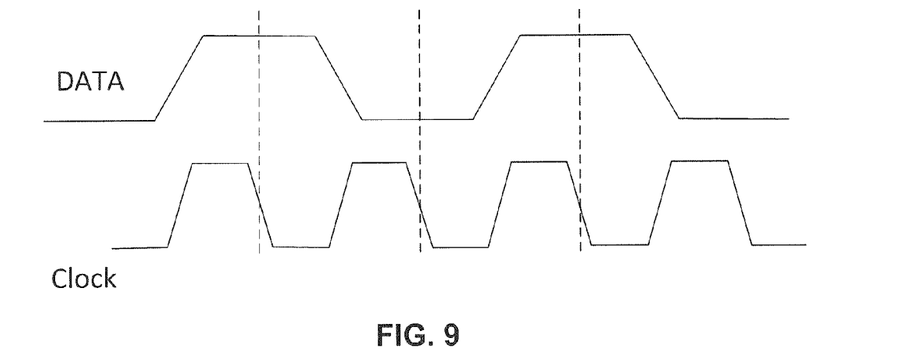

FIGS. 7, 8, and 9 show various relationships between data (Data) and clock (Clock), according to various embodiments of the present invention. FIG. 7 shows an undesirable situation when data is not aligned with a rising or falling edge of a clock. FIG. 8 shows when data is aligned with a rising edge of a clock. FIG. 9 shows when data is aligned with a falling edge of a clock. Various exemplary methods for alignment as discussed with respect to FIGS. 2, 3, 4, 5, and 6.

It is to be appreciated that data 220, 222, 224, and 228 include similar data, but are labeled differently to show they are either serialized, retimed, or driven versions of a previous stage of data along data section 201.

In one example, clock adjuster 210 adjusts clock 214 to produce clock 226, which is also aligned with data 224. A clock adjuster 210 is most optimally used for low speed signals, e.g., 1 GHz to 10 GHz. However, as speeds increase, accurate adjustment may not be achievable. For example, at 25 GHz the alignment may fall outside of allowable tolerances. Thus, alignment through retiming and clock adjustment may not be optimal for high speed signals.

In one example, for 25 Gbps transceiver applications, +/−20 ps adjustment with less than 1 ps resolution (step size) is desired for clock and data adjustment. Also, in one example, +/−5 ps adjustment is desired for different channel data adjustment. However, using system 200, which adjusts clock output delay, it is very difficult to achieve this desired wide range of adjustment at these high speeds because clock adjusters are optimally used only for lower speeds, e.g., 1 GHz to 10 GHz. Rather, data adjustment may be needed in order to achieve these desired characteristics.

Therefore, what is needed is clock-data adjustment that is implemented by adjusting data, rather than a clock, to allow for alignment of high speed data and with a high speed clock.

In a first embodiment of the present invention, there is provided a transmitting system comprising a clock system and a data system. The clock system is configured to receive a clock having a first value and produce a control signal having a second, different value and an output clock having the first value. The data system is configured to receive data and the control signal and to align the data with the output clock, based on the control signal, to produce output data.

In one example, the clock system comprises a driver configured to produce the output clock, a divider configured to divide the received clock, and a phase interpolator configured to rotate the divided clock to produce the control signal. The data system comprises a multiplexer and a driver. The multiplexer is configured to receive parallel data as the data input and to use the control signal to serialize the parallel data to produce the aligned data that is aligned with the output clock. The driver is configured to produce the output data from the aligned data.

In another example, the clock system comprises a driver configured to produce the output clock, a divider configured to divide the received clock in half and to produce first and second half clocks, and first and second rotators configured to rotate respective ones of the first and second half clocks to produce first and second control signals. The first and second parallel data are received at first and second data channels in the data system. The data system further comprises a first aligning system in the first data channel and a second aligning system in the second data channel. The first aligning system comprises first and second multiplexers configured to receive the first control signal, first and second preemphasis amplifiers coupled to outputs of respective ones of the first and second multiplexers, a first summer configured to sum outputs from the first and second preemphasis amplifiers, and a first driver coupled to an output of the first summer and configured to produce first output data. The second aligning system comprises third and fourth multiplexers configured to receive the second control signal, third and fourth preemphasis amplifiers coupled to outputs of respective ones of the third and fourth multiplexers, a second summer configured to sum outputs from the third and fourth preemphasis amplifiers, and a second driver coupled to an output of the second summer and configured to produce second output data.

According to another embodiment of the present invention, there is provided a system comprising a deserializer and a serializer. The serializer includes a transmitter. The deserializer is configured to receive serial data and produce parallel data and a clock. The serializer is configured to receive the parallel data and the clock and to produce serial output data and an output clock. The transmitter comprises a clock system and a data system. The clock system is configured to receive the clock having a first value and produce a control signal having a second, different value and the output clock having the first value. The data system is configured to receive the parallel data and the control signal and to align the parallel data with the output clock, based on the control signal, to produce the output data.

According to a further embodiment of the present invention, there is provided a method having the following steps (not necessarily all steps are performed or performed in the order shown). Generating an output clock and a divided clock based on a received clock. Phase rotating the divided clock to produce a control signal. Serializing parallel data using the control signal to produce output data, such that the output data is aligned with the output clock.

According to a yet further embodiment of the present invention, there is provided a method having the following steps (not necessarily all steps are performed or performed in the order shown). Generating an output clock and first and second divided clocks based on a received clock. Phase rotating the first and second divided clocks to produce first and second control signals. Serializing first parallel data using the first control signal. Producing first output data based on the first serialized data, such that the first output data is aligned with the output clock. Serializing second parallel data using the second control signal. Producing second output data based on the second serialized data, such that the second output data is aligned with the output clock.

Figure 3:
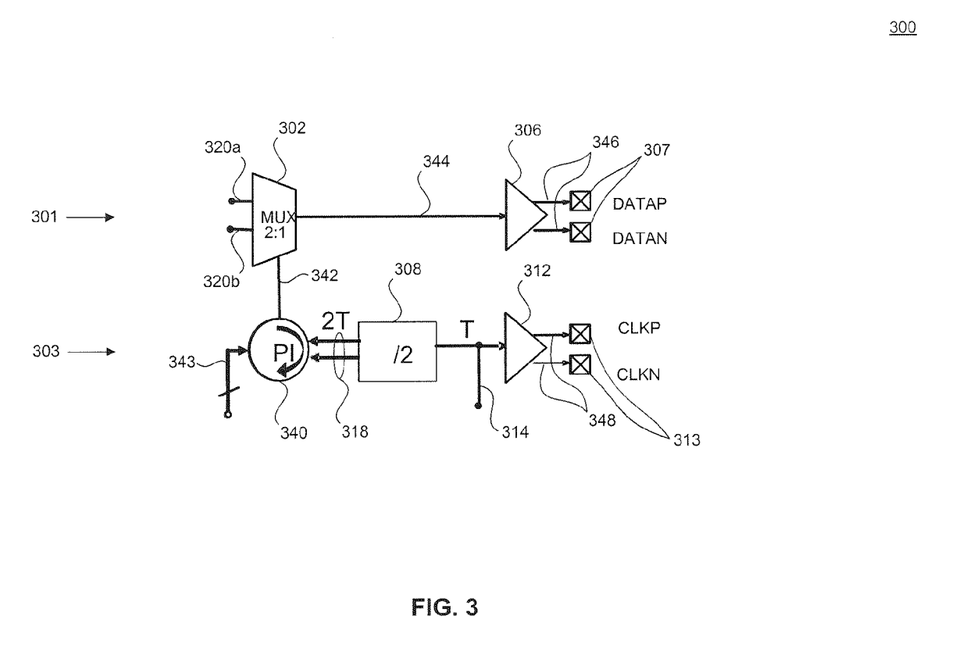
FIGS. 3 and 4 illustrate clock-data adjustment systems in which data is adjusted, according to various embodiments of the present invention.

FIG. 3 illustrates a clock-data adjustment system 300, according to an embodiment of the present invention. For example, in system 300 data output delay can be adjusted in contrast to the clock output delay adjustment shown in FIG. 2. In one example, system 300 can be implemented in transmitter/serializer (S) 110 of FIG. 1. System 300 includes a data section or system 301 and a clock section or system 303.

For example, by adjusting data rather than clock, a larger adjustment range can be achieved, which can also provide finer resolution. Embodiments of the present invention are directed to high speed clock-data adjustment with wide adjustment range, such as an adjustment range of +/−20 ps with clock frequency of 25 GHz and more. In one example, an embodiment of the present invention allows adjusting a lower frequency clock and hence is more power and area efficient.

In one example, data section 301 of system 300 includes a multiplexer (MUX) 302, a driver 306, and +/− I/O pads 307. Similar to multiplexer 202 in FIG. 2, multiplexer 302 is used to produce a serial data 344 from a parallel data 320a/320b.

In one example, clock section 303 of system 300 includes a divider 308, an interpolator or rotator 340 (e.g., a phase interpolator or phase rotator), a driver 312, and +/− I/O pads 313.

In one example, in operation a full-speed (1 T) clock 314 is first divided down by divider 312 to produce a half-speed (2 T) clock 318. Half-speed clock 318, e.g., a differential clock input, is then received by clock interpolator 340.

In one example, a half clock is used because a half speed clock: is easier to adjust using phase interpolator than a full speed clock, is easier to adjust over a large range, and is easier to use as a drive signal for multiplexer 302.

A range of outputs of clock 342 (e.g., control signals) from interpolator 340 is controlled by a received code 343, which is adjustable. In one example, code 343 comprises digital codes 0 to 64 or 0 to 256, such that a value of code 343 can be adjusted anywhere from 0 To 64 or 0 to 256. Through use of an application specific code, a wide range of values for clock 342 can be produced. For example, code 343 can be chosen based on a detected bit error rate of output data 346 and clock 348 characteristics. Also, clock 342 can have various phases, which cause a shift in time of the driving of multiplexer 302 to shift in time when data 320a or 320b is routed, to form serialized data 344. Thus, data 344 is adjusted to align with clock 314 based on a chosen phase rotation, such that output data 346 is aligned with output clock 348.

In one example, phase rotator 340 is controlled using code 343 to adjust a phase of an input signal, i.e., clock 318, to rotate a phase to any value between 0 degrees to 360 degrees to produce clock 342, as is known to a skilled artisan. As discussed above, values of sequences of codes 343 are determined based on specific applications of system 300. Through use of phase rotator 340, adjustments to clock 318 can be fine tuned to produce desired clock 342 that most optimally drives MUX 302 to shift in time when data 320a/b is routed through MUX 302 and device 306 to produce data 346 that is accurately aligned with clock 348.

In one example operation, an adjusted half-speed (2 T) clock 342 is received by MUX 302. Parallel data 320a/320b received at MUX 302 is retimed by clock 342 to produce retimed serialized data 344. The retimed serialized data 344 is output by driver 306 as output data 346. The retimed data 344 is also considered aligned data because it is aligned with clock 348.

For example, alignment or retiming is discussed above with regarding to FIGS. 2, 7, 8, and 9, such that the center of data is aligned with either a rising or falling edge of a clock, which can be application specific.

In this example, a path including divider 308, interpolator 340, MUX 302, and driver 306 becomes a data path.

It is to be appreciated that data 320, 344, and 346 include similar data, but are labeled differently to show they are either shifted/serialized or driven versions of a previous stage along data section 301.

In one example, half-speed (2 T) clock 318 can be adjusted over a 2 T range. The data output delay relative to the full-speed clock 348 can then be adjusted over a 2 T range.

Using system 300 in FIG. 3, in a 25 GHz (40 ps clock cycle) example, a +/−40 ps adjustment range can be achieved, which is larger than the +/−5 ps adjustment range achieved by system 200.

Therefore, through adjusting of data delay, as shown in FIG. 3, a range of clock-data adjustment is substantially increased, while at the same time preserving the high output amplitude for a high speed clock. Also, in the example shown in FIG. 3, the full-speed (1 T) clock is not adjusted, which substantially reduces or eliminates additional parasitic added to a clock circuit when the clock circuit is used for clock adjustment, e.g., as shown in FIG. 2, which additional parasitic can degrade the high speed clock performance.

Figure 4:
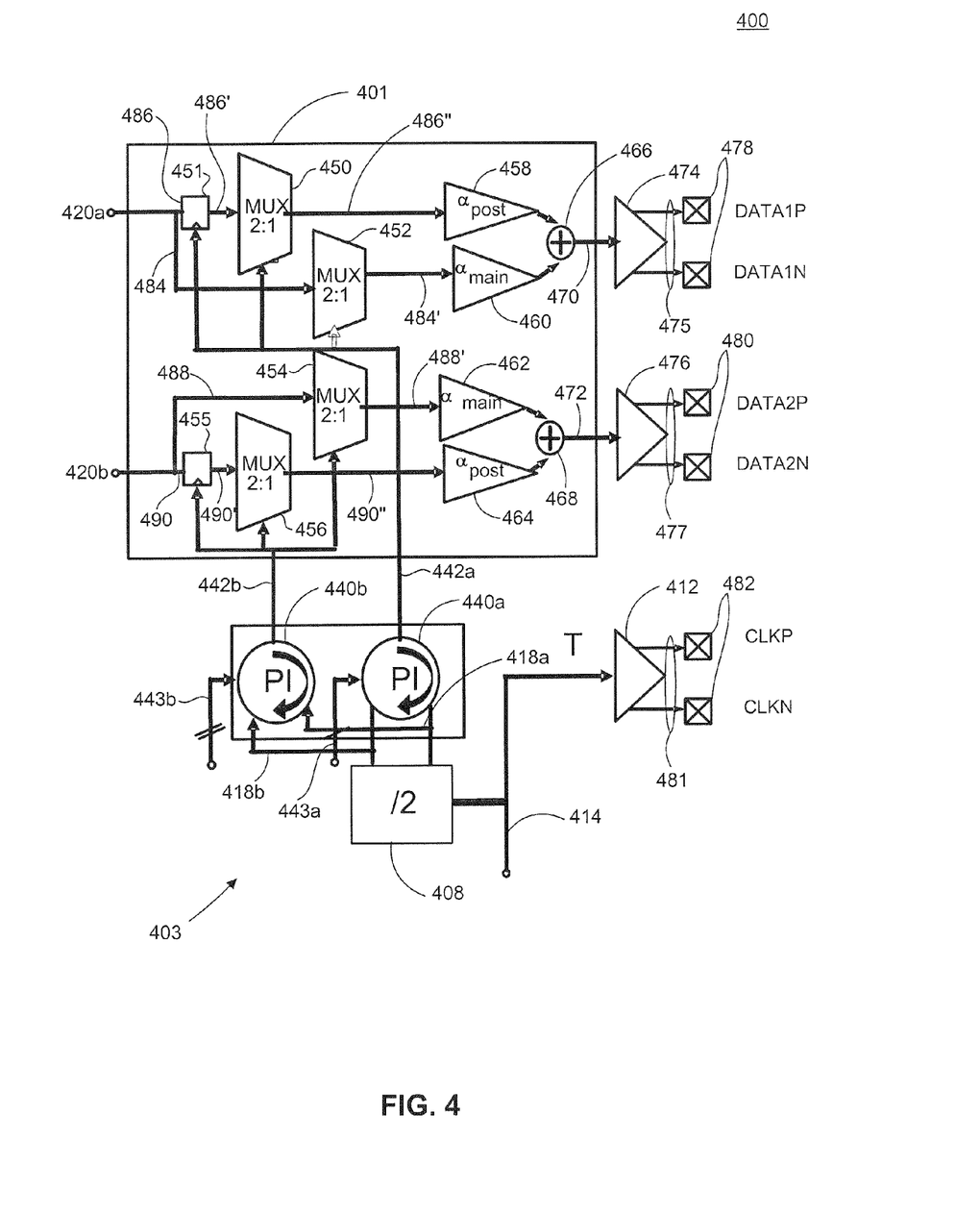

FIG. 4 illustrates a clock/data adjustment system 400, according to an embodiment of the present invention. For example, system 400 illustrates a two-channel 2-tap 25 Gbs/s transmitter architecture with 2-tap FIR (finite impulse response) and wide-range clock/data adjustment. In one example, system 400 can be implemented in transmitter/serializer (S) 110 of FIG. 1. System 400 includes a data section or system 401 and a clock section or system 403. It is to be appreciated that more than two data channels can also be used. An embodiment using two data channels is described below for brevity. Also, it is to be appreciated that transmitters can be used that include more than 2-tap FIR.

In one example, data section 401 includes two data channels or paths. Each path includes a two-multiplexer system with multiplexers 450 and 452 in the first path and multiplexers 454 and 456 in the second path. In one example, multiplexers 452 and 454 can be considered main multiplexers in a main path, while multiplexers 450 and 456 can be considered post multiplexers in a post path. Each multiplexer 450, 452, 454, and 456 transmits a signal to a corresponding preemphasis amplifier 458, 460, 462, and 464.

In one alternative example, before each post multiplexer, e.g., multiplexers 450 and 456, is an associated retiming device 451 and 455, respectively.

A first summer 466 in the first data path sums outputs from preemphasis amplifiers 458 and 460, and a second summer 468 in the second data path sums outputs from preemphasis amplifiers 462 and 464. The first and second summed signals 470 and 472 are individually provided to corresponding drivers 474 and 476 to produce output signals 475 and 477 through I/O pads +/− 478 and +/− 480.

In this example, two paths run through each of first and second data channels. A first path (e.g., a main path) in the first channel includes multiplexer 452 and preemphasis amplifier 460, while a second path (e.g., a post path) in the first channel includes retiming device 451, multiplexer 450, and preemphasis amplifier 458. Similarly, a first path (e.g., a main path) in the second channel includes multiplexer 454 and preemphasis amplifier 462, while the second path (e.g., post path) in the second channel includes retiming device 455, multiplexer 456, and preemphasis amplifier 464.

In this configuration, a delay (e.g., a 1 T delay) is generated between a signal 484/484' traveling along first path and a signal 486/486'/486" traveling along a second path. Similarly, a delay (e.g., a 1 T delay) is generated between a signal 488/488' traveling along a first path and a signal 490/490'/490" traveling along a second path. This delay between signals traveling along first and second paths, e.g., main and post paths, allows for high frequency boost of data, as seen in a Fourier transform. High frequency boost is performed because most channels exhibit low frequency characteristics, and the high frequency boost compensates for the low frequency characteristics. In other words, attenuation increases for higher frequencies relative to lower frequencies over a communications channel.

In this example, each preemphasis amplifier 458, 460, 462, and 464 has a different coefficient: amplifier 458 has coefficient αpost, amplifier 460 has coefficient αmain, amplifier 462 has coefficient αmain, and amplifier 464 has coefficient αpost. Thus, each set of amplifiers (458/460 and 462/464) can weight data differently. In one example, each amplifier has a preadjusted amplitude over a frequency domain. Again, as amplitude at high frequencies typically falls off over a communications channel, through use of amplifiers 458, 460, 462, and 464 system 400 can deemphasize the low frequencies and overemphasize the high frequencies. Also, in one example, through use of different coefficients for post and main devices in each data path, bandwidth issues can be substantially eliminated. This should allow for a reduction in bit error rate and an increase in accuracy of alignment between output data 475/477 and clock 481.

In one example, clock section 403 includes a driver 412 that transmits output clock 481 via +/− I/O pads 482, a divider 408, and first and second phase rotators or interpolators 440a and 440b driven by codes 443a and 443b, respectively. In operation, a clock 414 is divided by two to form two half clock signals 418a and 418b, e.g., differential half clocks, which are received at corresponding phase rotators 440a and 440b. Phase rotated signals 442a and 442b (e.g., control signals) are produced. Signal 442a is used to drive multiplexers 450 and 452 in the first data path, while signal 442b is used to drive multiplexers 454 and 456 in the second data path. Additionally, or alternatively, signal 442a drives retiming device 451, while signal 442b drives retiming device 455.

In this arrangement of FIG. 4, there is the ability to separately adjust the first and second data path, as necessary. Thus, this provides more control for independently aligning each output data signal 475 and 477 with output clock 481. Further, in one example, there is inter-channel adjustment provided through using first and second phase interpolators 440a and 440b.

In one example, similar to above for phase rotator 340, phase rotators 440a and 440b are controlled using input codes 443a and 443b to adjust a phase of an input signal, i.e., clock 418a or 418b, to rotate a phase to any value between 0 degrees to 360 degrees to produce clocks 442a and 442b. This allows for wide adjustment of shifting of trigger points for the data by shifting when a respective multiplexer routes input data.

In one example, clock 414 is at 25 GHz, which is divided by divider 408 to produce two 12.5 GHz signals 418a and 418b. In this example, signals 418a and 418b are sine waves, as phase rotators 440a and 440b function most effectively on sine waves. In one example, data signals 420a and 420b are at 12.5 Gbps each to match the half-speed clock.

In operation, with discussion of only the first data path for illustration, a rising edge of clock 442a at MUX 450 routes and aligns data 420a and a falling edge of clock 442a routes and aligns data 420a. Thus, two data signals 486" are transmitted from multiplexer 450 for each clock period, causing the data to be serialized at 25 Gbps. This is true for each of the four multiplexers 450, 452, 454, and 456. Thus, two 25 Gbps data signals 474 and 476 are ultimately output from system 400 from the 12.5 Gbps input signals.

In one example, FIG. 4 is a two channel 25 Gbs/s transmitter structure, which incorporates the above proposed clock-data adjustment scheme. In addition to the wide adjustment between clock and data alignment for each channel, two channels can be individually adjusted to compensate for any mismatch between channels. Moreover, post-emphasis amplifiers are utilized to compensate for other bandwidth limiting factors. Using this approach, in one example a resolution of less than 1 ps can be achieved with +/−1 clock period, e.g., +/−40 ps clock-data adjustment range for a 25 GHz clock (40 ps clock cycle). Also, +/−10 ps inter-channel adjustment range can be achieved between different channels.

Through one or more of the embodiments shown in FIGS. 3 and 4, clock-data adjustment for high speed data transmission rates exceeding 25 Gbs/s may be performed over a much wider range by adjusting data output, in contrast to adjusting clock output performed in FIG. 2. Also, very fine resolution may be achieved by using clock phase interpolation. Further, additional first path to second path mismatch may be compensated by individually adjusting data output delay using the first and second retiming devices.

Figure 5:
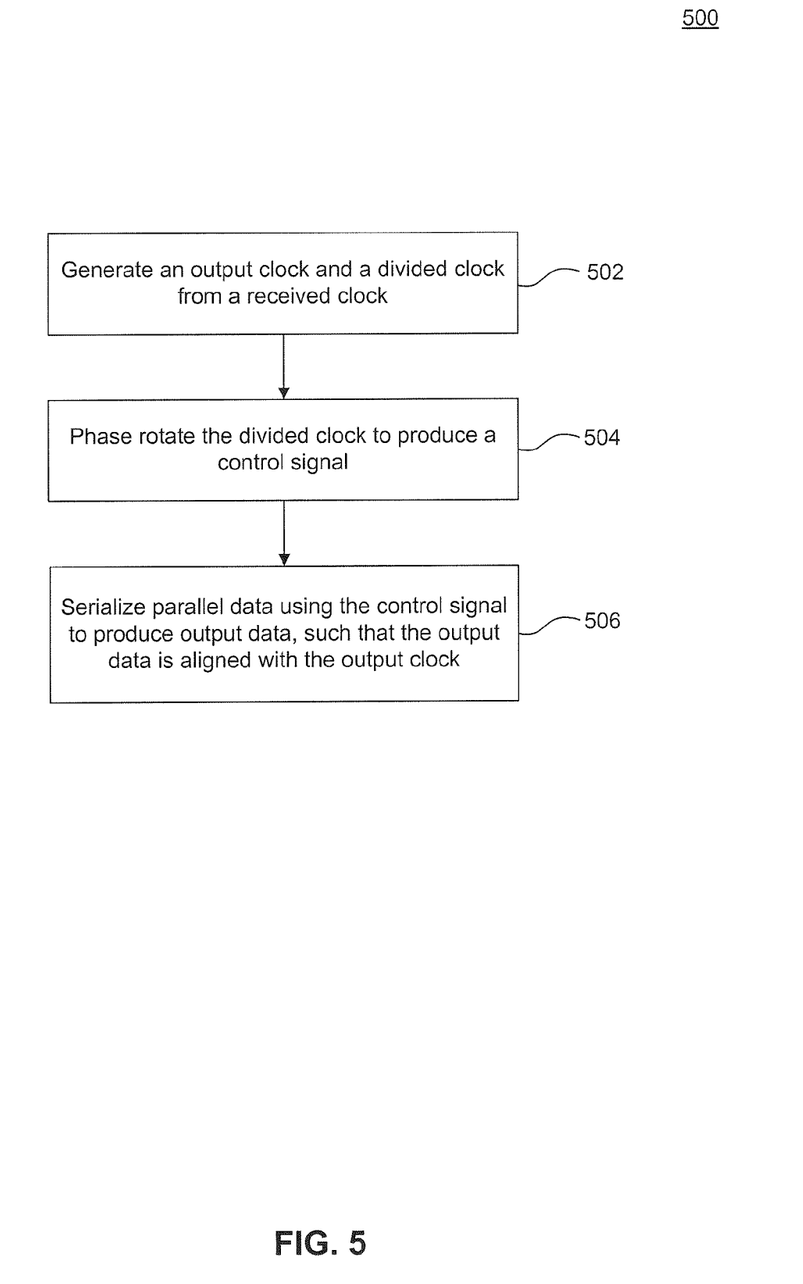
FIGS. 5 and 6 illustrate flow charts depicting methods, according to various embodiments of the present invention.

FIG. 5 illustrates a flow chart depicting a method 500, according to an embodiment of the present invention. In one example, method 500 is performed by system 300 in FIG. 3. Method 500 may comprise more or less steps, and not necessarily in the order shown. In step 502, an output clock and a divided clock are generated based on a received clock. In step 504, the divided clock is phase rotated to produce a control signal. In step 506, parallel data is serialized using the control signal to produce output data, such that the output data is aligned with the output clock.

FIG. 6 illustrates a flow chart depicting a method 600, according to an embodiment of the present invention. In one example, method 600 is performed by system 400 in FIG. 4. Method 600 may comprise more or less steps, and not necessarily in the order shown.

In step 602, an output clock and first and second divided clocks are generated based on a received clock. In step 604, the first and second divided clocks are phase rotated to produce first and second control signals.

In step 606, first parallel data is serialized using the first control signal. In step 608, first output data is produced based on the first serialized data, such that the first output data is aligned with the output clock. For example, the producing can be performed using elements in first and second paths of the first data channel, the summer and the driver, e.g., as described about with respect to FIG. 4.

In step 610, second parallel data is serialized using the second control signal. In step 612, second output data is produced based on the second serialized data, such that the second output data is aligned with the output clock. For example, the producing can be performed using elements in the first and second paths of the second data channel, the summer and the driver, e.g., as described about with respect to FIG. 4.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A transmitting system comprising:
   a clock system configured to:
      receive a clock having a value,
      produce a first control signal and a second control signal, and
      generate an output clock having the received clock value; and
   a data system configured to:
      receive data at a first data channel and a second data channel;
      receive the first and second control signals, wherein the first and second control signals are configured to independently control respective ones of the first and second data channels;
      align the data in the first and second data channels with the output clock based on respective ones of the first and second control signals; and
      produce output data.

2. The transmitting system of claim 1, wherein the clock system comprises:
   a driver configured to produce the output clock;
   a divider configured to divide the received clock; and a first phase interpolator and a second phase interpolator configured to rotate a divided clock to produce respective ones of the first and second control signals.

3. The transmitting system of claim 2, wherein the divider comprises a denominator of 2 to produce a half speed clock.

4. The transmitting system of claim 1, wherein the data comprises parallel data, and the data system comprises:
   a multiplexer configured to receive the parallel data and to serialize the parallel data as the aligned data; and
   a driver configured to produce the output data.

5. The transmitting system of claim 4, wherein the multiplexer is configured to temporally adjust the parallel data to produce the aligned data, such that a range of adjustment of the parallel data to produce the aligned data is approximately greater or smaller than 1 clock period.

6. The transmitting system of claim 1, wherein the clock system comprises:
   a driver configured to produce the output clock;
   a divider configured to divide the received clock in half and to produce first and second half clocks; and
   first and second rotators configured to rotate respective ones of the first and second half clocks to produce respective ones of the first and second control signals.

7. The transmitting system of claim 1, wherein the data system comprises:
   a first aligning system in the first data channel; and
   a second aligning system in the second data channel.

8. The transmitting system of claim 7, wherein:
   the first aligning system comprises:
      first and second multiplexers configured to receive the first control signal;
      first and second preemphasis amplifiers coupled to outputs of respective ones of the first and second multiplexers;
      a first summer configured to sum outputs from the first and second preemphasis amplifiers; and
      a first driver coupled to an output of the first summer and configured to produce a first output data; and
   the second aligning system comprises:
      third and fourth multiplexers configured to receive the second control signal;
      third and fourth preemphasis amplifiers coupled to outputs of respective ones of the third and fourth multiplexers;
      a second summer configured to sum outputs from the third and fourth preemphasis amplifiers; and
      a second driver coupled to an output of the second summer and configured to produce a second output data.

9. The transmitting system of claim 8, further comprising:
   a first retiming device located before the second multiplexer in the first aligning system; and
   a second retiming device located before the fourth multiplexer in the second aligning system.

10. The transmitting system of claim 1, wherein the transmitting system is included within a serializer of a serializer-deserializer (SERDES) apparatus.

11. A system, comprising:
    a deserializer configured to receive serial data and produce parallel data and a clock; and
    a serializer configured to receive the parallel data and the clock and to produce serial output data and an output clock, the serializer comprising a transmitter, the transmitter comprising:
       a clock system configured to:
          receive the clock having a value,
          produce a first control signal and a second control signal, and
          generate the output clock having the received clock value; and
       a data system configured to;
          receive the parallel data at a first data channel and a second data channel;
          receive the first and second control signals, wherein the first and second control signals are configured to independently control respective ones of the first and second data channels;
          align the parallel data in the first and second data channels with the output clock based on respective ones of the first and second control signals; and
          produce the serial output data.

12. The system of claim 11, wherein the clock system comprises:
    a driver configured to produce the output clock;
    a divider configured to divide the input clock in half; and
    a first phase interpolator and a second phase interpolator configured to rotate a divided clock to produce respective ones of the first and second control signals.

13. The system of claim 11, wherein the data system comprises:
    a multiplexer configured to receive the parallel data and to serialize the parallel data as the aligned data; and
    a driver configured to produce the output data.

14. The system of claim 11, wherein the clock system comprises:
    a driver configured to produce the output clock;
    a divider configured to divide the input clock in half and to produce first and second half clocks; and
    first and second rotators configured to rotate respective ones of the first and second half clocks to produce respective ones of the first and second control signals.

15. The system of claim 11, wherein the data system comprises:
    a first aligning system comprising:
       first and second multiplexers configured to receive the first control signal;
       first and second preemphasis amplifiers coupled to outputs of respective ones of the first and second multiplexers;
       a first summer configured to sum outputs from the first and second preemphasis amplifiers; and
       a first driver coupled to an output of the first summer and configured to produce a first output data; and
    a second aligning system comprising:
       third and fourth multiplexers configured to receive the second control signal;
       third and fourth preemphasis amplifiers coupled to outputs of respective ones of the third and fourth multiplexers;
       a second summer configured to sum outputs from the third and fourth preemphasis amplifiers; and
       a second driver coupled to an output of the second summer and configured to produce a second output data.

16. The system of claim 15, further comprising:
    a first retiming device located before the second multiplexer in the first aligning system; and
    a second retiming device located before the fourth multiplexer in the second aligning system.

* * * * *

UNITED STATES PATENT AND TRADEMARK OFFICE
CERTIFICATE OF CORRECTION

PATENT NO.       : 8,731,098 B2
APPLICATION NO.  : 12/882739
DATED            : May 20, 2014
INVENTOR(S)      : Cui et al.

It is certified that error appears in the above-identified patent and that said Letters Patent is hereby corrected as shown below:

In the Claims

Column 12, line 7, claim 11, replace ";" with --:--.

Signed and Sealed this
Twelfth Day of August, 2014

Michelle K. Lee
*Deputy Director of the United States Patent and Trademark Office*